US012373871B2

(12) United States Patent
Rubinson et al.

(10) Patent No.: US 12,373,871 B2
(45) Date of Patent: Jul. 29, 2025

(54) METHOD, MEDIUM, AND SYSTEM FOR INTERFACE EXTENSION OPERATIONS AND INTERFACES IN AN ITEM LISTING SYSTEM

(71) Applicant: eBay Inc., San Jose, CA (US)

(72) Inventors: Ethan Benjamin Rubinson, San Jose, CA (US); Mark Jeffrey Weinberg, Los Gatos, CA (US); Senthil Kumar Padmanabhan, San Jose, CA (US); Parin Pankaj Jogani, San Francisco, CA (US)

(73) Assignee: eBay Inc., San Jose, CA (US)

( * ) Notice: Subject to any disclaimer, the term of this patent is extended or adjusted under 35 U.S.C. 154(b) by 48 days.

(21) Appl. No.: 17/359,353

(22) Filed: Jun. 25, 2021

(65) Prior Publication Data
US 2022/0414736 A1 Dec. 29, 2022

(51) Int. Cl.
*G06Q 30/00* (2023.01)
*G06F 16/248* (2019.01)
*G06Q 30/0601* (2023.01)

(52) U.S. Cl.
CPC ....... *G06Q 30/0627* (2013.01); *G06F 16/248* (2019.01); *G06Q 30/0603* (2013.01); *G06Q 30/0625* (2013.01); *G06Q 30/0641* (2013.01)

(58) Field of Classification Search
CPC .......... G06Q 30/0627; G06Q 30/0603; G06Q 30/0625; G06Q 30/0641; G06F 16/248; G06F 16/9538
(Continued)

(56) References Cited

U.S. PATENT DOCUMENTS

2015/0082355 A1* 3/2015 Tiddens ........... H04N 21/43637
725/48
2015/0254258 A1 9/2015 Kagan et al.
(Continued)

FOREIGN PATENT DOCUMENTS

EP 4109302 A1 12/2022
WO 2018/111273 A1 6/2018

OTHER PUBLICATIONS

Rekimoto, Jun. "Tilting operations for small screen interfaces." Proceedings of the 9th annual ACM symposium on User interface software and technology. 1996. (Year: 1996).*
(Continued)

*Primary Examiner* — Matthew E Zimmerman
(74) *Attorney, Agent, or Firm* — Shook, Hardy & Bacon L.L.P.

(57) ABSTRACT

Various methods and systems for providing customized-item-specific interfaces of items on extended interface devices in a search system. A plurality of items—each having an extended interface configuration that indicates customized-item-specific interface instructions for extended presentation of items on extended interface devices—are accessed at a primary interface device associated with a set of extended interface devices including a second-user extended interface device that supports a social mode. Based on the first extended interface configuration of a first item, a determination is made that the first item is extendable to a first extended interface device in the set of extended interface devices. Based on determining that the first item is
(Continued)

extendable, automatically causing generation of a customized-item-specific interface of the first item on the first extended interface device. Causing generation of the customized-item-specific interface can be based on communicating item extended interface data to the first extended interface device.

20 Claims, 9 Drawing Sheets

(58) Field of Classification Search
USPC .................................................... 705/26.63
See application file for complete search history.

(56) References Cited

U.S. PATENT DOCUMENTS

| | | | |
|---|---|---|---|
| 2017/0187811 A1* | 6/2017 | Thomée | H04L 65/61 |
| 2018/0121560 A1* | 5/2018 | Chen | G06F 16/954 |
| 2019/0303420 A1* | 10/2019 | Bourothu | H04N 21/4516 |
| 2020/0218502 A1* | 7/2020 | Andersen | G06F 3/0481 |
| 2020/0257486 A1 | 8/2020 | Kamiyama et al. | |
| 2022/0222304 A1* | 7/2022 | Chung | G06F 16/90324 |
| 2022/0309274 A1* | 9/2022 | Umeda | G06V 30/414 |

OTHER PUBLICATIONS

Extended European Search Report received for European Patent Application No. 22180666.4 mailed on Oct. 20, 2022, 8 Pages.
Bellino et al., "Youtube4two: socializing video platform for two co-present people", Proceedings of the 23rd International Conference on World Wide Web, Apr. 7, 2014, pp. 131-134.
Seifert et al., "Extending Mobile Interfaces with External Screens", 18th International Conference, Austin, Sep. 2, 2013, pp. 722-729.
Office Action Received for Australian Patent Application No. 2022204483, mailed on Jun. 8, 2023, 4 pages.
Notice of Acceptance Received for Australian Patent Application No. 2022204483, mailed on Jul. 24, 2023, 3 pages.
Office Action Received for Canadian Patent Application No. 3,162,726, mailed on Jul. 25, 2023, 6 pages.
Office action received for Australian Patent Application No. 2023258316, mailed on Oct. 18, 2024, 3 pages.
Notice of Allowance received for Canadian Patent Application No. 3162726, mailed on May 21, 2024, 1 page of original document.
Office action received for Australian Patent Application No. 2022204483, mailed on Mar. 3, 2023, 4 pages of original copies only.
Office Action received for European Application No. 22180666.4, mailed on May 20, 2025, 5 pages.

* cited by examiner

METHOD, MEDIUM, AND SYSTEM FOR INTERFACE EXTENSION OPERATIONS AND INTERFACES IN AN ITEM LISTING SYSTEM

BACKGROUND

Users often rely on search systems to help find information stored on computer systems. Such search systems support identifying, for received search queries, search query result items from item databases. For example, a search query, can be executed using a search system to find relevant search result items for the search query. The search can be performed on different types of devices (e.g., a mobile device, Augmented Reality/Virtual Reality ("AR/VR") device, desktop device, or personal digital assistant device). The different types of devices can have different types of interfaces for performing the search and presenting the search result items. The search result items may have a variety of item features that make each search result item more suitable for display on particular device type interfaces. For example, a three-dimensional (3D) item may be more suitable for display on an AR/VR device and 4K video content may be more suitable for display on a 4K display.

Conventional search systems are limited in their capacity to support presenting search results items on a preferred viewing interface for a particular item. For example, a specific search result item—relative to other search result items—is not intelligently identified and provided for viewing on an interface of a device that supports an optimized viewing of the specific search result item. With the ever-increasing use of search systems for retrieving electronically stored information, improvements in computing operations and interfaces for search systems can provide more efficient presenting of search query result items and efficiency in user navigation of graphical user interfaces in search systems.

SUMMARY

Embodiments of the present invention relate to methods, systems and computer storage media for providing extended interface configurations associated with customized-item-specific interfaces of items in an item listing system, where—based on the extended interface configurations—the items are presented on extended interface devices. An extended interface configuration identifies preference data and instructions for presenting an item (e.g., a search result item)—using a customized interface for the item—on a secondary interface device (i.e., an extended interface device) that is different from a primary interface device used to perform the search query. In particular, an extended interface configuration is generated for an item—in an item database of an item listing system—such that, the item is extended for display based on both the item features of the item and device interface features of a device type that is identified as a preferred device type for presenting the item. The customized-item-specific interface includes tailored interface-presenting features and instructions for presenting a corresponding item on a type of interface of a device (e.g., mobile device, Augmented Reality/Virtual Reality ("AR/VR") device, desktop device, or personal digital assistant device). For example, a 3D illusion lamp that projects holograms may preferably be viewed on an AR/VR device, as such, an extended interface configuration is associated with the 3D illusion lamp, such that, it can be selectively presented on an available AR/VR device (i.e., the extended interface device) associated with a user.

In addition, items of a landing page or search result items associated with a search query can be returned on a searching device (e.g., primary interface device) before being selectively extended to be presented—on corresponding extended interface devices assigned to a user—based on the extended interface configuration of the items. For example, using a mobile device (i.e., a primary interface device associated with a set of extended interface devices of a user), a user can navigate to a landing page of a search system, or perform a search operation to generate search result items—and the landing page items or search result items can be automatically and selectively caused to be presented on extended interface devices. The items can be selectively caused to be displayed on interfaces of any of the following types of device: a first extended interface device (e.g., a 3D model of a shirt presented on an AR/VR device); a second extended interface device (e.g., a plurality of images of a car presented on a television screen); a third extended interface device (e.g., an audio recording of a car engine on a digital assistant speaker). The types of extended interface configuration for items can include the instructions for what type of extended interface device the search result items can be extended to, where the extended interface configuration is digitally encoded within computer code embedded corresponding to the search item result.

Moreover, the extended interface configuration can be used to initiate a social mode for selectively presenting items on a second-user extended interface device of a second user. For example, a first user may cause an extended interface configuration of an item to be updated for viewing items on the second-user interface device. A second-user extended interface device can be explicitly identified as a preferred device for displaying the item. The user may cause the extended interface configuration of the item to be temporarily updated to include the second-user extended interface device as a preferred device for viewing the item. Based on updating the extended interface configuration of the item, the social mode is initiated between a primary interface device of the first user and the second-user extended interface device. In this way, the updated extended interface configuration of the item is used to trigger the social mode and extend viewing of the item on the second-user extended interface device. Upon completion of the social mode, the updated extended interface configuration may optionally be reverted to the original extended interface configuration. As such, the extended interface configuration can be used to support a social mode for a shared searching experience between the first user and the second user.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1A:
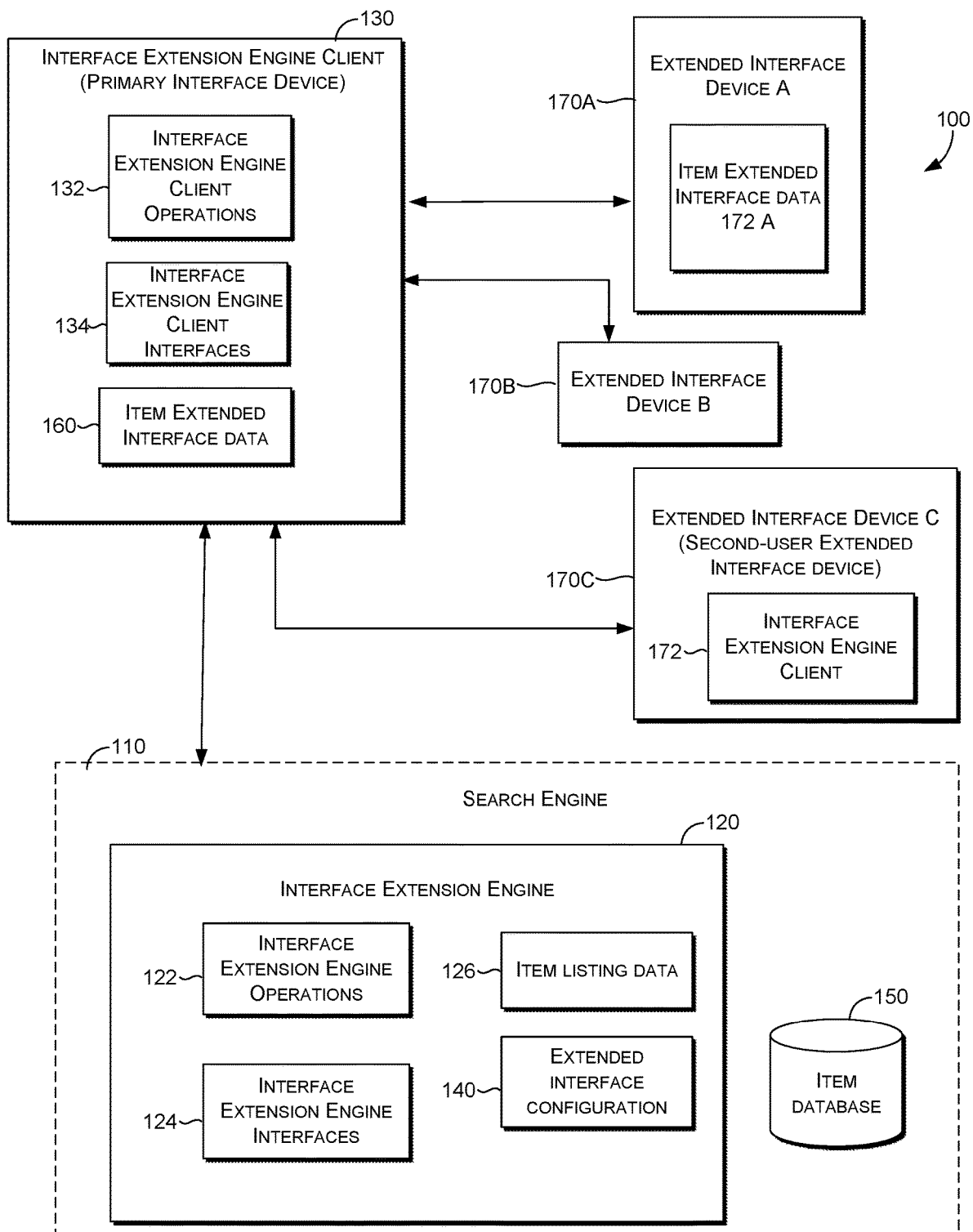
FIGS. 1A and 1B are block diagrams of an exemplary search system with an interface extension engine, in which embodiments described herein may be employed.

Overview of Technical Problems, Technical Solutions, and Technological Improvements Search systems support identifying, for received queries, query result items from item databases. Item databases can specifically be for content systems or item listing systems such as EBAY content system, developed by EBAY INC., of San Jose, California Conventional search systems can be implemented in search engines of item listing systems to support electronic activities associated with buying and selling items (e.g., products or online services). An item listing system is accessible via different types devices (e.g., mobile devices, desktop device, laptops, personal digital assistants, AR/VR devices, large format monitors and spatial computing devices) that provide user interfaces for interactions with the item listing system. The user interfaces allow effective operation and control of the devices from users, while the devices provide information that helps the user navigate the item listing system. For example, an item listing system can include interface features for searching items, selecting items, and buying and selling items.

Items in an item listing system can vary in category and classification (e.g., books, motors, sporting goods) and are conventionally provided with limited intelligence on what type of device interfaces of devices to assist in the user experience. Moreover, the items can further have different item characteristics or item dimensions (i.e., item features). The item features impact how the items are presented on a particular type of device from which the user is accessing the item platform. For example, presenting trading cards on a mobile device may not negatively impact a user experience as much as presenting a classic automobile that can be viewed from multiple angles. In addition, brick-and-mortar shopping is often a social experience—with users communicating with each other their opinions on a particular item. This social experience aspect of brick-and-mortar can often be lost in conventional interfaces and interface workflows that support item listing systems.

Reviewing items—and particularly search result items—can be challenging for users because conventional search systems provide search result items based primarily on the device on which the search is performed. For example, a user can perform a search on a mobile device for a "car" and the search result items (i.e., different types of cars) are presented for review on the mobile device—often with several pictures from different angles, which can be challenging to review on an interface of the mobile device. Users, sometimes, may begin performing an operation on a first device and may need to perform additional operations of search result items on another device interface. For example, a user may take pictures for an item listing interface—using their mobile phone—but may then need to review details of the images of the pictures on a different device interface before completing the item listing operation.

Moreover, users often like to interact with other users when performing searches on a search system for items; however conventional systems are limited in their capacity to make certain images of selected search result items available to a second user for review on the second user's device. And, the ability to seamlessly support communications between a first user and a second user—about the item—can be limited. In this regard, performing a search can often include several manual actions in switching contexts, delays in switching devices, and limitations in the capacity to review items on unsuitable device interfaces. As such, an alternative and more comprehensive approach for presenting items in an item listing system—particularly with reference to different device interfaces and social search experiences—can improve the item listing operations and interfaces in an item listing system.

Embodiments of the present disclosure are directed to providing extended interface configurations associated with customized-item-specific interfaces of items that are presented on extended interface devices. An extended interface configuration identifies preference data and instructions for presenting an item (e.g., a search result item)—using a customized interface for the item—on a secondary interface device (i.e., an extended interface device) that is different from a primary interface device used to perform the search query. In particular, an extended interface configuration is generated for an item—in an item database of an item listing system—such that, the item is extended for display based on the item features of the item and device interface features of a device type that is identified as a preferred device type for presenting the item.

By way of example, a user is associated with a first device (e.g., a mobile device), a second device (e.g., a desktop), a third device (e.g., an AR/VR headset), a fourth device (e.g., a digital assistant speaker). The first device is referred to as a primary interface device, and the second device, third device, and fourth device can be referred to as a set of extended interface devices. The user enters a search query (e.g., "hiking gear") that generates search result items (e.g., camping thermal sleep bag, trek walking hiking poles, and metal pocket compass). Based on the search result items, an extended interface session can be initiated for the primary interface device and an extended interface device from the set of extended interface devices. The extended interface session is generated based on an extended interface configuration of an item in the search results item. Based on the extended interface configuration of the item, the extended interface session interface can include customized-item-specific interfaces generated on each of the extended interface devices. For example, a search result item from search result items of a search query can include an extended interface configuration that allows the item to be presented on an extended interface device that is different from the primary interface device.

The extended interface configuration is generated for an item—in an item database of an item listing system—such that, the item is extended for display based on the item features of the item and device interface features of a device type. The extended interface configuration can be computer code that is digitally encoded into items of the item listing system. The device interface features and device type are identified as preferences for presenting the item. The extended interface configuration can include the item features (e.g., measurements, product attributes, seller instructions) of an item and device interface features (e.g., device screen dimensions, resolution). The extended interface configuration can further include instructions on extending the presentation of the items on an extended interface device identified from the set of extended interface devices. The extended interface configuration can include a device type—as a preferred device type for an item—which is explicitly identified by a seller via a listing interface when uploading the item for sale. For example, a first search result item can be configured for optimized viewing on a desktop, while based on the item features of a second search result item, the second search result item can be configured for viewing an AR/VR headset. The extended interface configuration can be digitally encoded into items in the items database and communicated as part of the search result items associated with a query or a landing page.

Operationally, a subset of items—provided via an interface of a primary interface device—can be selectively extended to corresponding extended interface devices based on the instructions in the extended interface configuration of the item. In this way, a set of items are generated on a primary interface device, then a first item can be extended to an extended interface device—based on the features of the first item—while a second item is not extended to an extended interface device.

Moreover, if an extended interface configuration identifies a device type for a search result item, but the device is not available in the set of extended interface devices for the user, then the search result will not be extended. It is contemplated that an interface element (e.g., warning or message) can be generated to communicate to the user that the search result item is extendable; however, no corresponding extended interface device exists in the set of extended interface devices for the user. Data (e.g., item extended interface data) items can be automatically (or based on a user interaction input) communicated for viewing on a corresponding extended interface device. User interaction controls associated with the item and the device can be provided via the customized-item-specific interface. For example, a set of user interaction controls may support viewing and reviewing features of the customized-item-specific interface. An interface (e.g., extended interface session settings interface) can support identifying user preferences for extended interface session operations associated with the user. For example, the user can select a preference to automatically extend an item that has an available extended interface device or request approval from the user prior to extending the item.

Extending search result items can be associated with a social mode extended interface session ("social mode") that includes a second user having a second-user device in the set of extended interface devices. A social mode can be initiated based on a first user causing an update to the extended interface configuration of an item to include a second-user device and the preferred device for presenting the item. The social mode provides social mode controls (e.g., chat interface) that allows the first user to communicate with the second user with reference to the item.

A second-user extended interface device can be explicitly identified as a preferred device for displaying the item. The user may cause the extended interface configuration of the item to be temporarily updated to include the second-user extended interface device as a preferred device for viewing the item. For example, the user may select a search result item, and then trigger a social mode—including identifying a second interface device from the set of second interface devices. The second interface device is similar to the other extended interface devices that include device features that can be used compared with an extended interface configuration to support extending an item for presentation. In social mode, the extended interface configuration is updated such that an identified second-user extended interface device can be used for displaying a customized-item-specific interface in social mode.

Based on updating the extended interface configuration of the item, the social mode is initiated between a primary interface device of the first user and the second-user extended interface device. In this way, the updated extended interface configuration of the item is used to trigger the social mode and extend viewing of the item on the second-user extended interface device. In social mode, the item is also associated with a customized-item-specific interface. The customized-item-specific interface can include additional functionality for presenting and communicating about the item. For example, in addition to controls to view the item, the customized-item specific interface can include a chat for the first user and the second user to communicate about the item. Upon completion of the social mode, the updated extended interface configuration can be reverted to the original extended interface configuration. As such, the extended interface configuration can be used to support a social mode for a shared searching experience between the first user and the second user.

Accordingly, embodiments of the present invention of the present invention are directed to simple and efficient methods, systems and computer storage media for providing customized-item-specific interfaces of items on extended interface devices in a search system. An interface extension engine client accesses an extended interface configuration of an item to cause generation of customized-item-specific interfaces based on item features and device interface features of device types. Items in an item listing system are associated with an extended interface configuration, the extended interface configuration indicates customized-item-specific interface instructions that instruct on extended presentation of the item on another device for interacting with the item. The interface extension engine further operates based on two or more devices that are associated with two different users, where the extended interface session (e.g., a social mode in contrast to a single-user mode) is executed based on first user features and second user features. The interface extension engine and interface extension engine client operate to cause generation—in a single-user mode with one user or a social mode with multiple users—customized-item-specific interfaces in different contexts of the item listing system (e.g., a seller listing interface or buying interface).

Embodiments of the present invention have been described with reference to several inventive features (e.g., operations, systems, engines, and components) associated with a search system having extended interface configurations for presenting items on extended interface devices. Inventive features described include: operations, interfaces, data structures, and arrangement of computing resources associated with providing the functionality described herein relative the extended interface configuration. Functionality of the embodiments of the present invention have further been described, by way of an implementation and anecdotal examples—to demonstrate that the operations for providing customized-item-specific interfaces on extended interface devices an interface extension engine—are an unconventional ordered combination of operations that operate with an interface extension engine as a solution to a specific problem in search technology environment to improve computing operations and interfaces for user interface navigation in search systems. Overall, these improvements result in less CPU computation, smaller memory requirements, and increased flexibility in search systems when compared to previous conventional search systems operations performed for similar functionality.

Overview of Exemplary Environments for Interface Extension Engine Operations

Figure 1B:
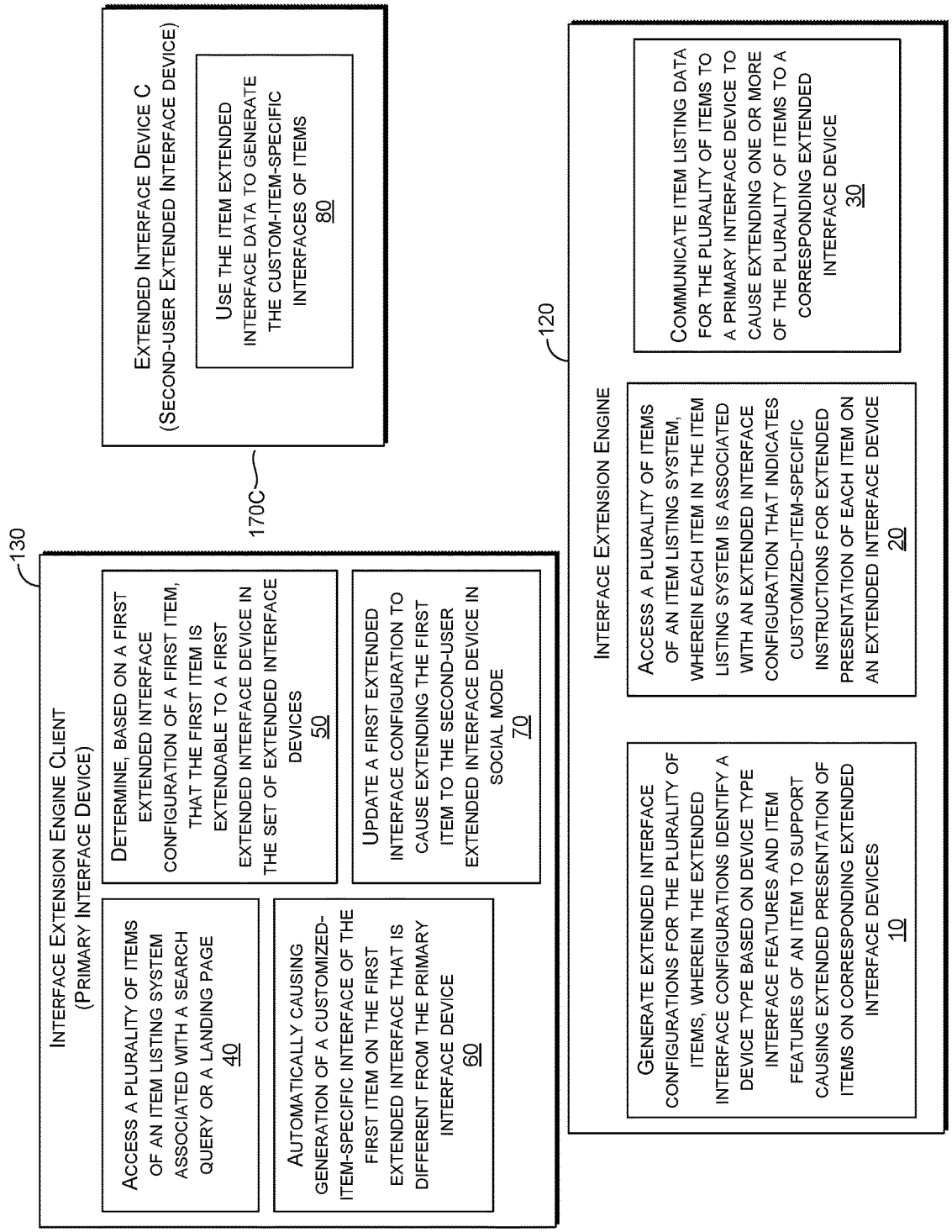
Figure 6:
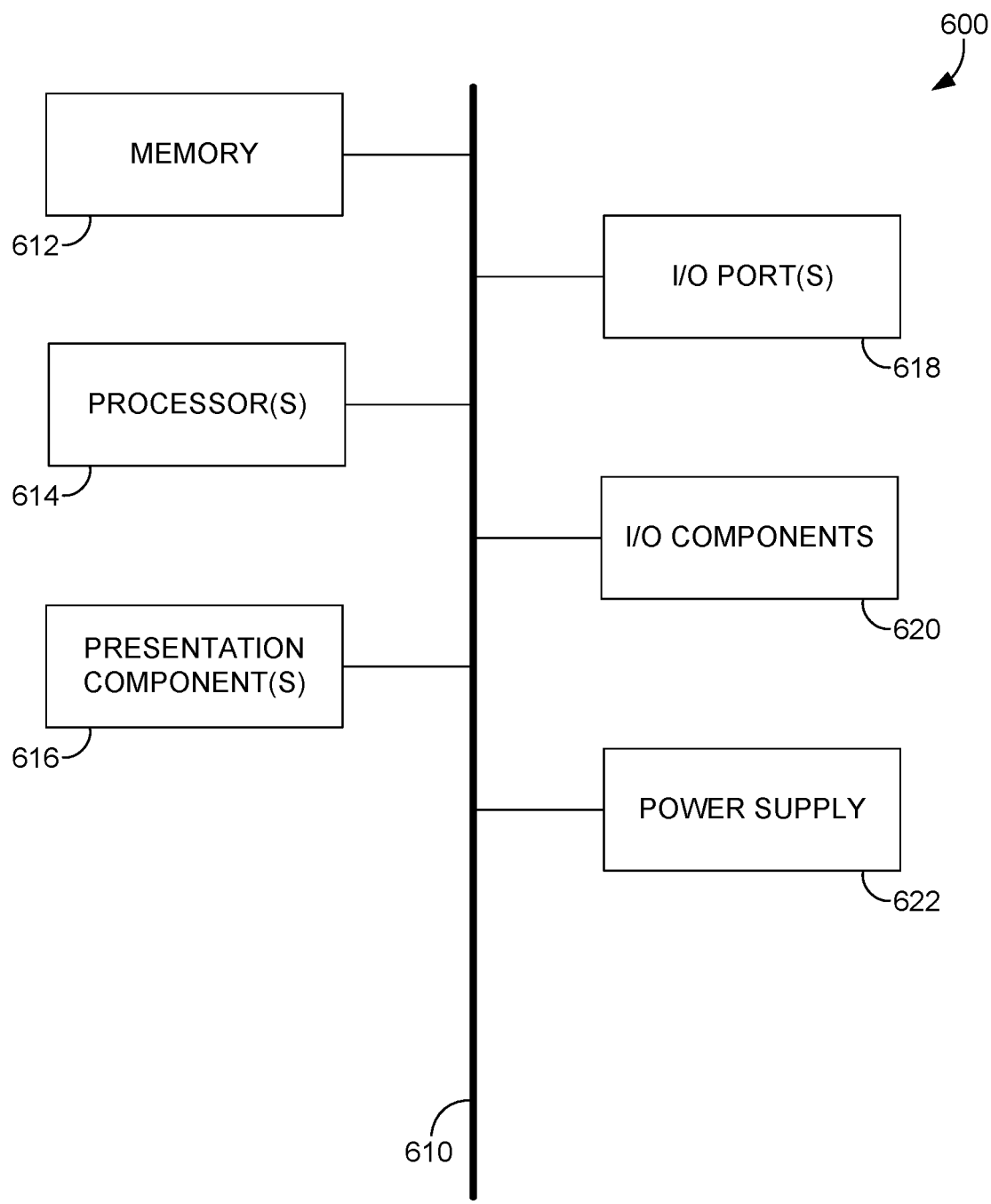
FIG. 6 is a block diagram of an exemplary computing environment suitable for use in implementing embodiments described herein.

Aspects of the technical solution can be described by way of examples and with reference to FIG. 1A, 1B, and FIG. 2. FIG. 1A is a block diagram of an exemplary technical solution environment, based on example environments described with reference to FIG. 6 for use in implementing embodiments of the technical solution are shown. Generally the technical solution environment includes a technical solution system suitable for providing the example search system 100 in which methods of the present disclosure may be employed. In particular, FIG. 1 shows a high level architecture of the search system 100 in accordance with implementations of the present disclosure. Among other engines, managers, generators, selectors, or components not shown (collectively referred to herein as "components"), the technical solution environment of search system 100.

With reference to FIG. 1A, FIG. 1A illustrates the exemplary search system 100 in which implementations of the present disclosure may be employed. In particular, FIG. 1A shows a high level architecture of search system 100 having components in accordance with implementations of the present disclosure. Among other components, managers, or engines not shown, search system 100 includes search engine 110—having the interface extension engine 120, interface extension engine operations 122, interface extension engine interfaces 124, item listing data 126, extended interface configuration instructions 140, and item database 150—interface and extension engine client 130 having interface extension engine client operations 132, interface extension engine client interface 134, and the item extended interface data 160; extended interface device A 170A, extended interface device B 170B, and extended interface device C 170C having interface extension engine client 172. The components of the search system 100 may operate together to provide functionality for providing customized-item-specific interfaces of items on specific interfaces of devices (i.e., extended interface devices) based on item features of the items and device interface features, as described below.

The interface extension engine 120 is responsible for identifying items (e.g., search result items and landing page items) and their corresponding extended interface configurations, such that, the extended interface configurations are communicated to the interface extension engine client 130. The interface extension engine 120 is a computing resource having software or hardware for driving the operations that support extending items for presentation on extended interface devices (e.g., extended interface device A 170A, extended interface device B 170B, extended interface device C 170 C). The interface extension engine 120 executes operations (i.e., interface extension engine operations 122) communicates via interfaces and causes generation of graphical user interfaces (i.e., interface extensions engine interfaces 124) via the search engine (i.e., search engine 110).

The interface extension engine 120 further communicates with a primary interface device operating a client of the interface extension engine (i.e., interface extension engine client 130 on a primary interface device). The interface extension engine 120 communicates extended interface configurations (i.e., extended interface configuration instructions 140) for item listing data (e.g., search result items or landing page items) associated with items in an item database (e.g., item database 150). For example, a search query can cause the search engine 110 to generate search results items based on items in the item database 150. The search result items are accessed at the interface extension engine 120 as item listing data 126.

Based on the item listing data 126, extended interface configurations associated with items in the item listing data are communicated with the search results items to the interface extension engine client 130. The item listing data 126 can also be associated with items of a landing page of the search engine 110, such that, the interface extension engine 120 identifies extended interface configurations 140 for the items from the landing page in the item listing data 126. The extended interface configurations 140 of the items are communicated to the interface engine client 130. Other variations and combinations—of using the interface extension engine 120 to determine items and their corresponding extended interface configurations 140, such that, the extended interface configurations are communicated to the interface extension engine client 130—are contemplated with embodiment described herein.

The extended interface configuration instructions 140 ("extended interface configuration" used herein interchangeably)—received at the interface extension engine client 130—indicate customized-item-specific interface instructions for extended presentation of each item on an extended interface device. The extended interface configuration is a computing object in a defined data structure. The data structure includes instructions for how to display an item type. The instructions can identify the item, preferred device type for extending or causing display of the item, and describe how to create the customized-item-specific interface (e.g., UI elements and arrangement of the item on the extended interface device). A set of rules can be support evaluating item features of an item and mapping the item to a device type based on the device type interface features that are suitable for display the items. A listing interface may also cause generation of a prompt to a seller—listing an item for sale—to manually identify a preferred device type of view the item, such that the device type is added to the extended interface configuration.

The interface extension engine client 130 includes operations (i.e., interface engine client operations 132) and interfaces (interface extension engine client interfaces 134) that support causing items to be extended. For example, a 3D illusion lamp and AR/VR device type can be stored in the extended interface configuration. The 3D illusion lamp has a set of features ("item features") and the AR/VR device type has a set of feature ("device interface features"). The 3D illusion lamp is mapped to the AR/VR device type based on the item features corresponding to device interface features. The instructions for the customized-item specific interface can be generated based on a command library associated with the interface extension engine 130.

Operationally, the extended interface configuration for the 3D illusion lamp is accessed, a determination is made that a preferred device type for the 3D illusion lamp is an AR/VR device. The set of extended interface devices are accessed. If an AR/VR device is available in the set of extended interface devices, the item is extended for presentation on the AR/VR device. Extending an item to an extended interface device includes causing display of the item on an interface associated with the extended interface device. Extending the item can be based on a casting protocol or any other communication protocol that allows the extended interface device to receive item extended interface data (e.g., item extended interface data 172A of extended interface device A 170A) and cause display of the item. In this way, the item is selectively extended to the extended interface device based on the extended interface configuration. It is contemplated that the item may remain on display on the primary interface device, but it can also be removed from a display of the primary interface device and caused to be displayed exclusively on the extended interface device. The user may also be prompted to confirm whether or not the item should be extended to the extended interface device. Other variations and combinations of an interface extension engine client using an extended interface configuration for extending presentation of an item to an extended device interface are contemplated with embodiments described herein.

The primary interface device can operate in social mode with a second-user extended interface device (e.g., extended interface device C 170C), a user of a primary interface device can identify an item and cause an update of the extended interface configuration of the item. Updating the extended interface configuration can include updating the device type in the extended interface configuration to a specific second-user extended interface device. In this way, the interface extension client engine can access the set of extended interface devices to identify the second-user extended interface device and cause an extended presentation of the item on the second-user extended interface device based on the same operations and interfaces for extending other items to extended interface devices. The second-user device—extended interface device C 170— can include an interface extension engine client 172 that supports additional social functionality (e.g., a chat interface, comment interface) for exchanging messages between the primary interface device. The messages can be specifically associated with specific items that are extended on the second-user interface device.

Turning to FIG. 1B, FIG. 1B illustrates the interface extension engine 120, the interface extension engine client 130 and extended interface device C 170 C. The interface extension engine 120, interface extension engine client, and extended interface device C are configured to perform the operations identified. At block 10, the interface extension engine 20 generates extended interface configurations for a plurality of items. The extended interface configurations identify a device type based on a device type interface features and item features of an item to support causing extended presentation of items on corresponding extended interface devices. At block 20, interface extension engine 120, accesses a plurality of items of an item listing system, where each item in the item listing system is associated with an extended interface configuration that indicates customized-item-specific instructions for extended presentation of each item on an extended interface device. At block 30, the interface extension engine 120 communicates item listing data for the plurality of items to a primary interface device to cause extending one or more of the plurality of items to a corresponding extended interface device.

At block 40, the interface extension engine client 40 accesses a plurality of items of an item listing associated with a search query or a landing page, and at block 50 determines, based on a first extended interface configuration of a first item, that the first item is extendable to a first extended interface device in the set of extended interface devices. At block 60, the interface extension engine client 130, automatically causes generation of a customized-item-specific interface of the first item on the first extended interface that is different from the primary interface device. At block 70, the interface extension engine client 130 further supports updating a first extended interface configuration to cause extending the first item to the second-user extended interface device in social mode. At block 80, the extended interface device C— second user extended interface device—uses the item extended interface data to generate the custom-item-specific interface of items.

Figure 2A:
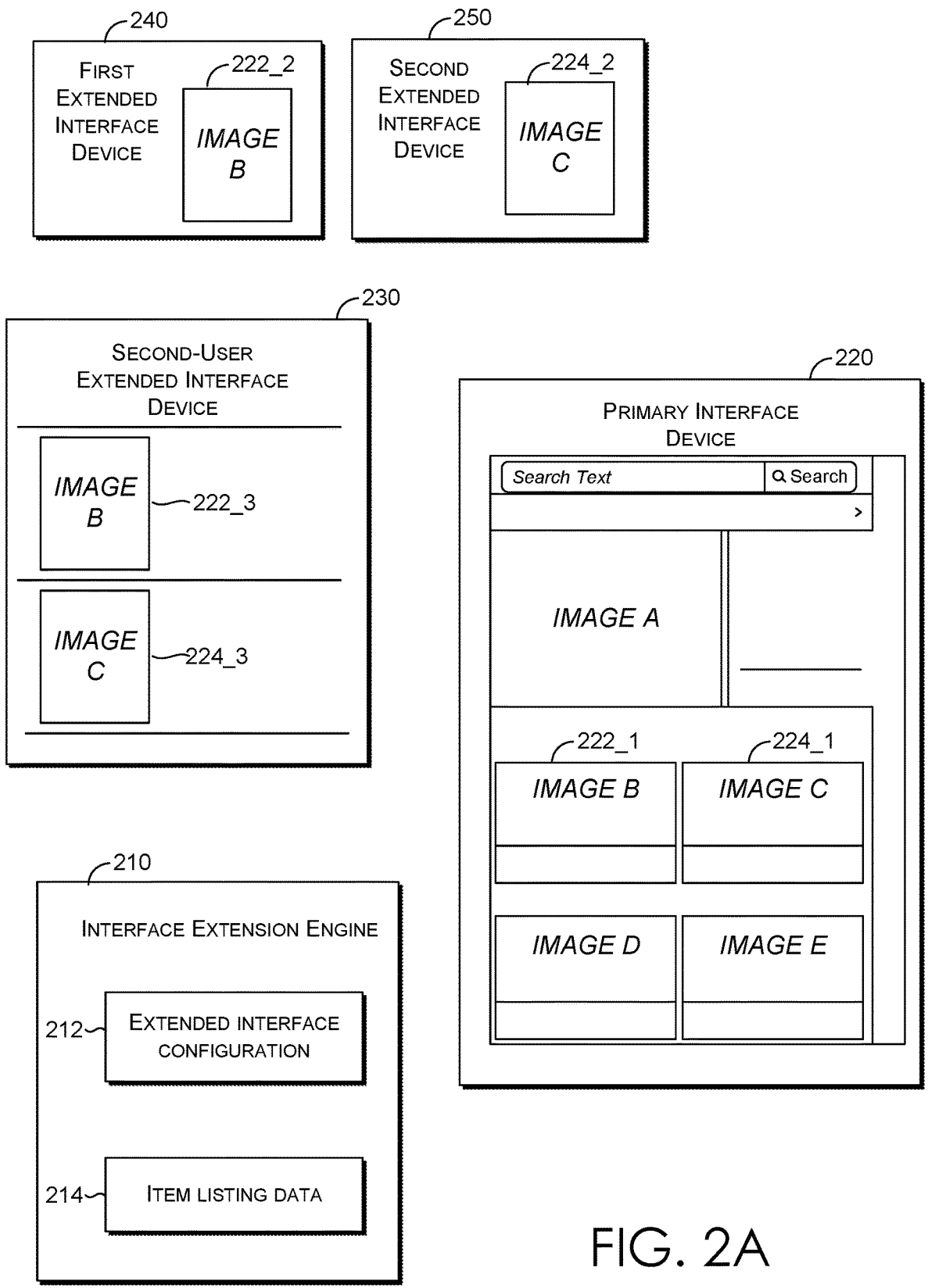
FIGS. 2A, 2B, and 2C are illustrations of exemplary search system interfaces for an interface extension engine, in which embodiments described herein may be employed.

Turning to FIG. 2A, FIG. 2A illustrates interface extension engine 210 having extended interface configuration instructions 212, item listing data 214, primary interface device 220 having image B 22_1, and image C 224_1, the first extended interface device 240 having image B 222_2, the second extended interface device having image C 224_2, and second-user extended interface device 230 having image B 222_3 and image C 224_3. Operationally, the interface extension engine 210 accesses item listing data (e.g., search result items or landing page items) having items having corresponding extended interface configurations. As discussed herein, the extended interface configuration for an item is determined based on item features of the item that correspond to a particular device interface features of a device type. The extended interface configuration includes instructions for a customized-item-specific interface for extending presentation of the item on extended interface devices. The primary interface device 220 can cause display of items (e.g., image B 222_1 and image C 224_1) that each have extended interface configurations—image B 222_1 and image C 224_1 can be extended as image B 222_2 and image C 224_2 on the first extended interface device 240 and the second extended interface device 250, respectively. In social mode, image B 222_1 and image C 224_1 can be have their extended interface configurations updated to cause extended image B 222_1 and image C 224_1 to the second-user extended interface device 230 as image B 222_3 and image C 224_3.

Figure 2B:
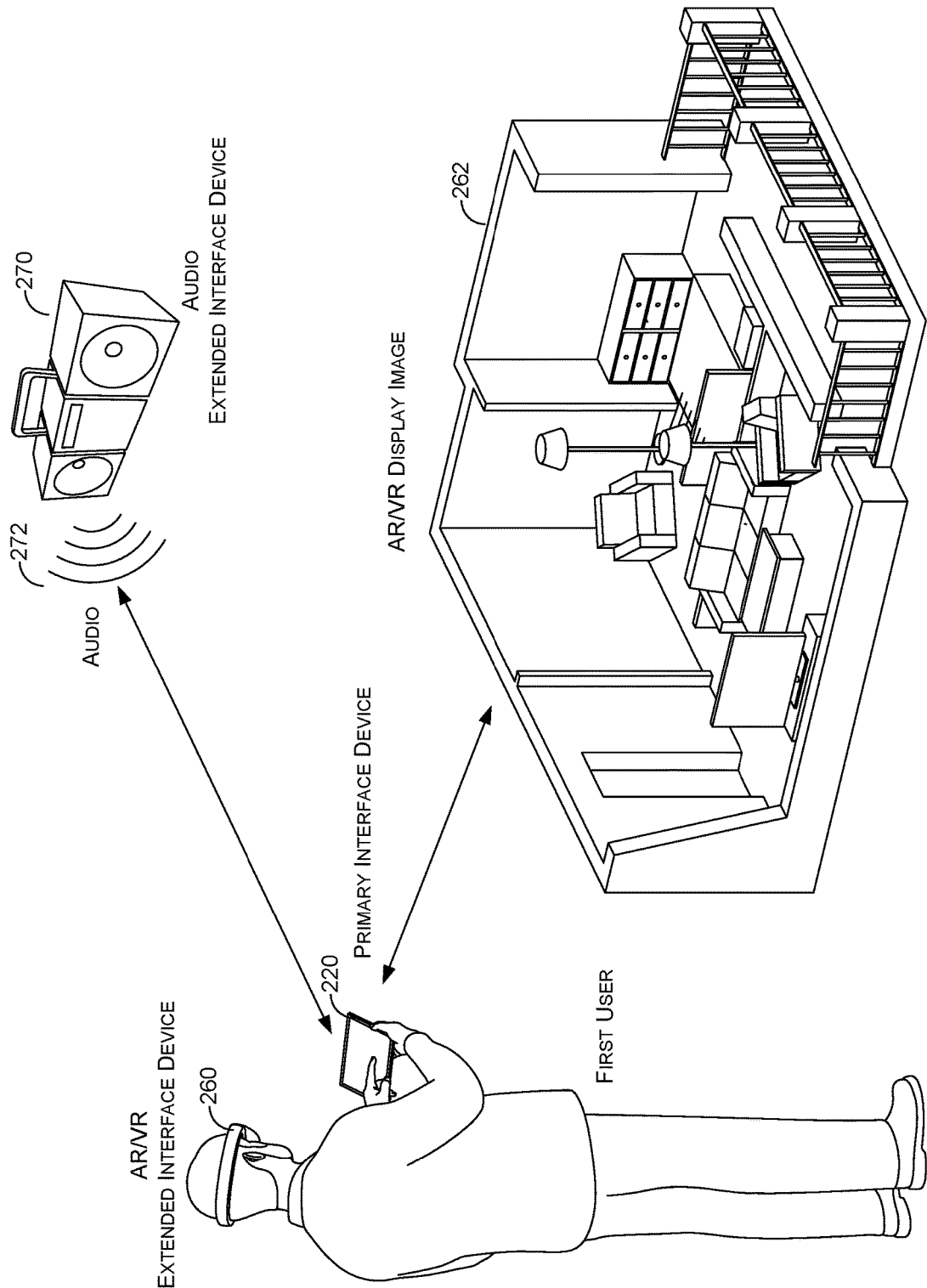

With reference to FIG. 2B, FIG. 2B illustrates the primary interface device 220, a fourth extended interface device 260 causing display of image 262, and a fifth extended interface device 270 causing playback of audio 272. The primary interface device 220 can receive extended interface configurations 212 and item listing data 214 to cause extending items on extended interface devices. The fourth extended interface device 260 can be an AR/VR device that is used to extend any items having an extended interface configuration that indicates an AR/VR device interface as the preferred type of extended interface device. The fifth extended interface device 270 can be an audio device that is used to extend an item having an extended interface that indicates an audio device interface as the preferred type of extended interface device.

Figure 2C:
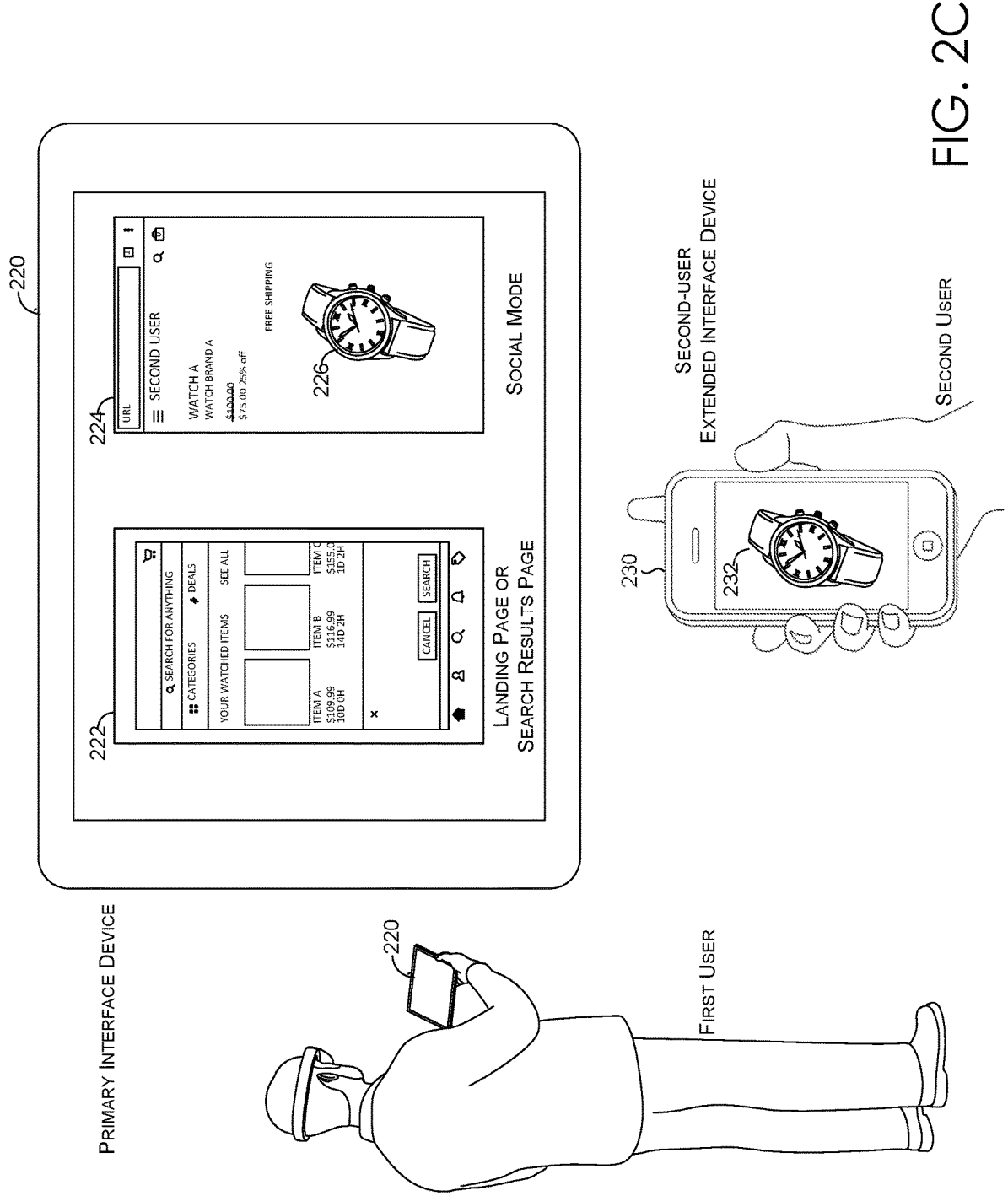

Turning to FIG. 2C, FIG. 2C illustrates the primary interface device 220, having a first interface portion 222 and a second interface portion 224 having item 226; and a second-user interface device causing display of image 232. The first interface portion 222 can be associated with a landing page that includes a plurality of items that are presented for display based on navigating to the landing page. The first interface portion 222 can be associated with a search result items page that includes a plurality of items that are presented for display based on executing a search query. The plurality of items associated with the landing page or the plurality of items associated with the search result items page can having corresponding extended interface configurations that support causing display of each item on the second-user interface device 230.

The second interface portion 224 can be associated with causing an item to be extended for display on the second-user interface device. The second interface portion 224 can be generated to cause updating an extended interface configuration of the item 226. The second interface portion 224 can be generated based on selecting an item for display on the second-user interface device in social mode. Based on selecting the item for display on the second-user interface device 230 in social mode, an extended interface configuration of the item can be updated to identify the second-user interface device as a preferred device for displaying the item. Based on updating the extended interface configuration, the second-user interface device 230 caused to display the item 232. Additional functionality, as discussed herein, can be available via the second-user interface device 230, and functionality based on the primary interface device 220 and the second-user interface device 230 being communicatively coupled to each other.

Exemplary Methods for Providing Interface Extension Engine Operations

Figure 3:
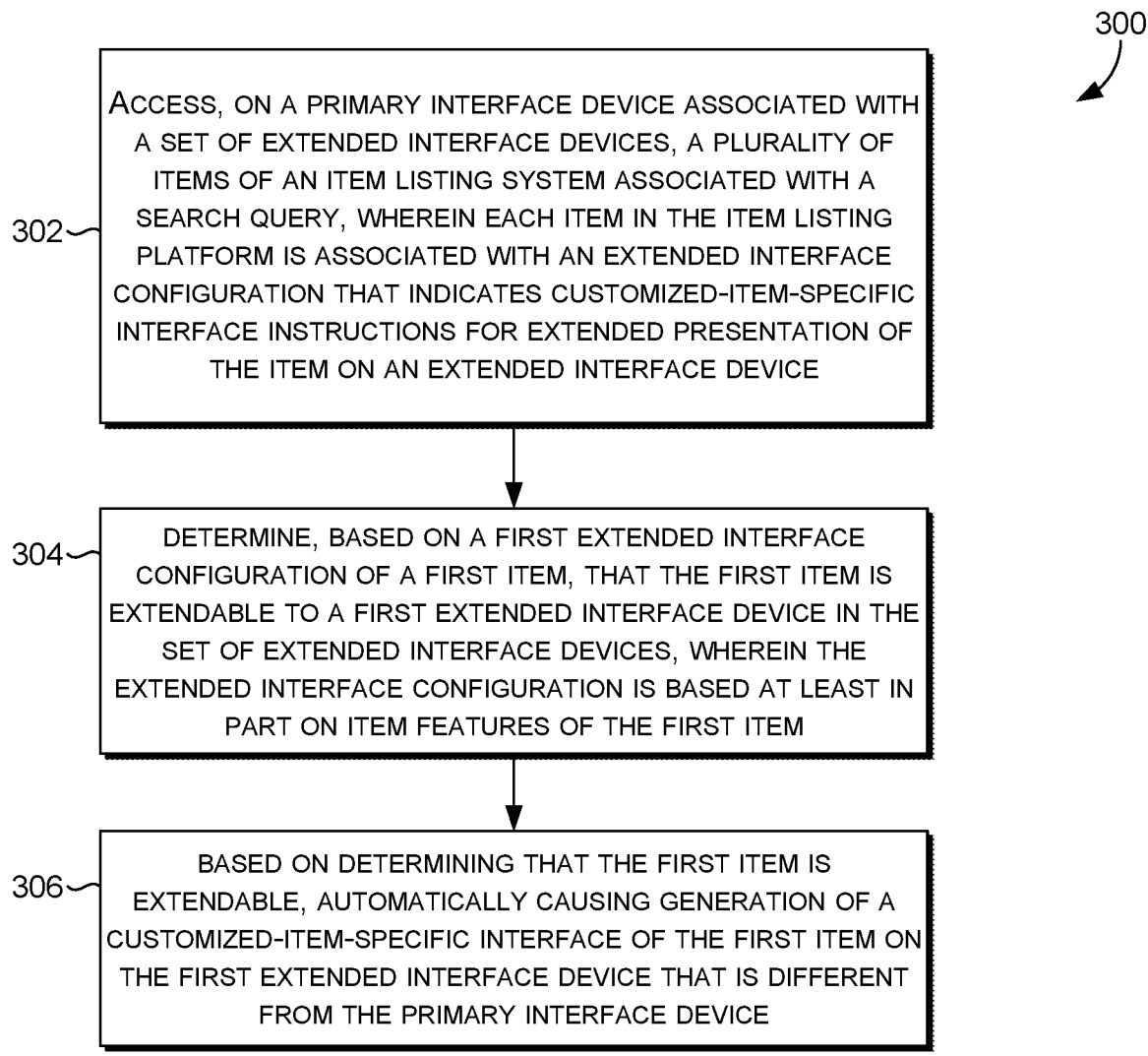
FIG. 3 is a flow diagram showing an exemplary method for implementing a search system with an interface extension engine, in accordance with embodiments described herein.
Figure 4:
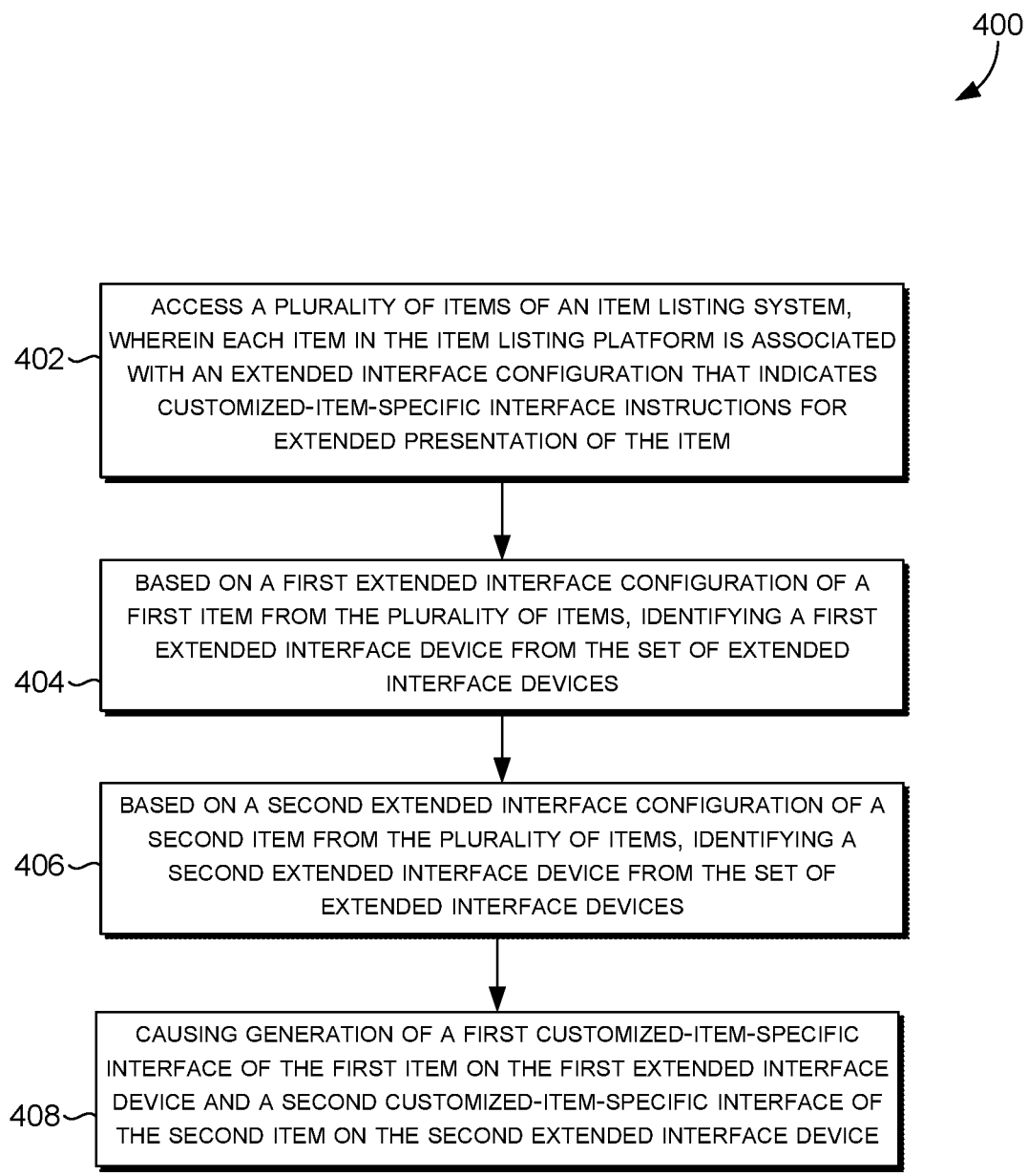
FIG. 4 is a flow diagram showing an exemplary method for implementing a search system with an interface extension engine, in accordance with embodiments described herein.
Figure 5:
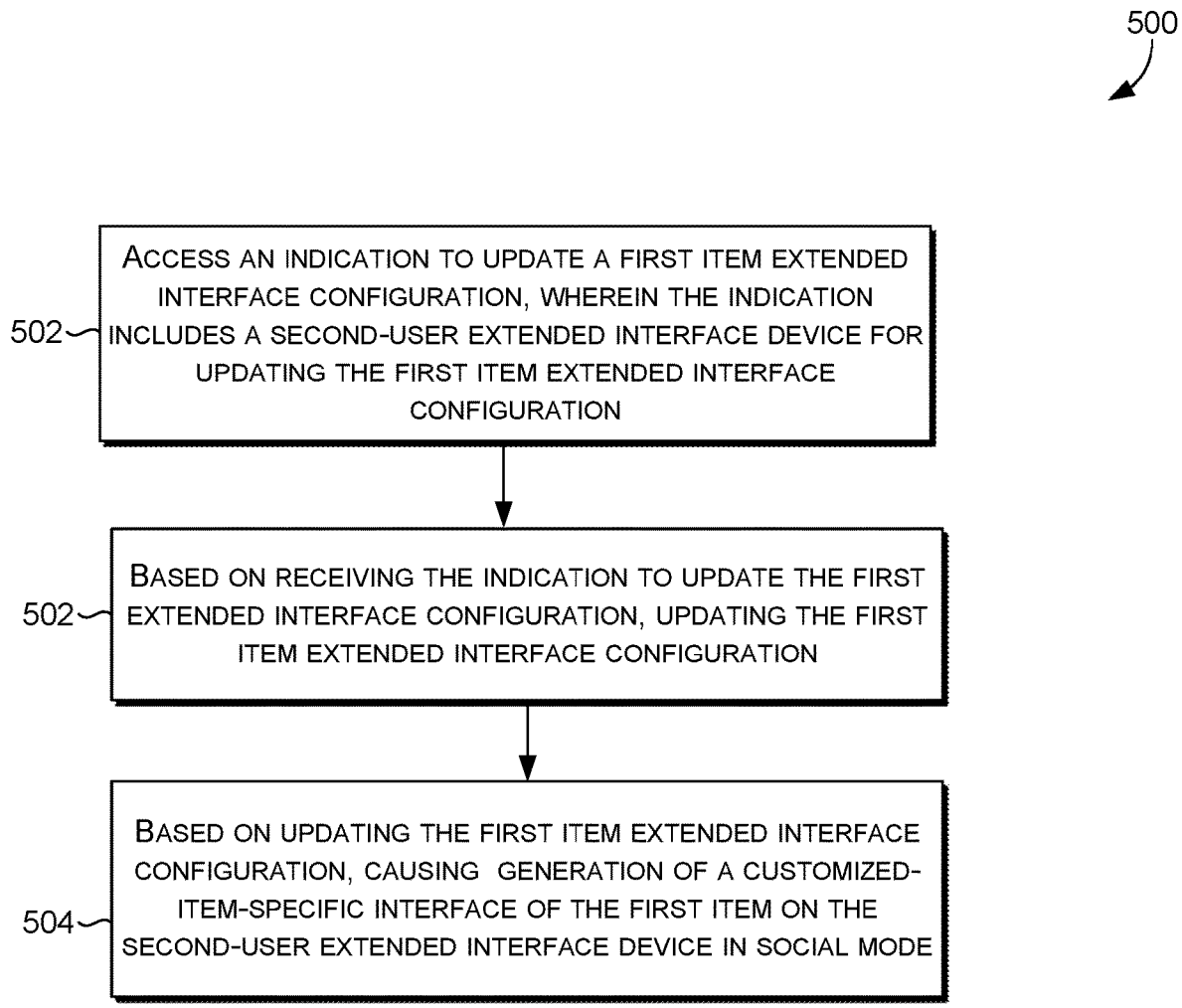
FIG. 5 is a flow diagram showing an exemplary method for implementing a search system with an interface extension engine, in accordance with embodiments described herein.

With reference to FIGS. 3, 4 and 5, flow diagrams illustrate methods for providing customized-item-specific interfaces of items on extended interface devices in a search system. The methods may be performed using the search system, interface extension engine, and interface extension engine client, described herein. In embodiments, one or more computer-storage media having computer-executable or computer-useable instructions embodied thereon that, when executed, by one or more processors can cause the one or more processors to perform the methods (e.g., computer-implemented method) in the search system (e.g., a computerized system or computing system).

Turning to FIG. 3, a flow diagram is provided that illustrates a method 300 for providing customized-item-specific interfaces of items on extended interface devices in a search system. Initially at block 302, a plurality of items of an item listing system associated with a search query are accessed at a primary device associated with a set of extended interface devices. Each item in the item listing system is associated with an extended interface configuration that indicates customized-item-specific interface instructions for extended presentation of each item on an extended interface device. The primary extended interface device is enabled to extend presentation of the plurality of items based on an associated between the primary interface device and the set of extended interface device. The primary interface device comprises operations and interfaces to establish the association with the set of extended interface devices and selectively cause generation of customized-item-specific interfaces on the set of extended interface devices.

At block 304, based on a first extended interface configuration of a first item, a determination is made that the first items is extendable to a first extended interface device in the set of extended interface devices. The set of extended interface devices have corresponding device types associated with corresponding device type interface features. The extended interface configuration of items are based on item features of the items and device type interface features of the device type. Determining that the first extended interface configuration of the first item is extendable to the first extended interface is based on accessing the first extended configuration of the first item; based on the first extended configuration, determining that the first item is extendable to an extended interface device having a device type; accessing the set of extended interface devices; and determining that the first extended interface device matches the device type in the first extended configuration of the first item. Causing of the customized-item-specific interface of the first item on the first extended interface device that is different from the primary interface device is based on a casting protocol that allows the first extended interface device to receive item extended interface data to cause display of the item via the first extended interface device.

At block 306, based on determining that the first item is extendable, automatically causing generation of a customized-item-specific interface of the first time on the first extended interface device that is different from the primary interface device. Automatically causing of the customized-item-specific interface of the first item on the first extended interface device that is different from the primary interface device is based on a casting protocol—that allows the first extended interface device to receive item extended interface data to cause display of the item via the first extended interface device.

Turning to FIG. 402, a flow diagram is provided that illustrates a method 400 for implementing a search system for customized-item-specific interfaces of items on extended interface devices. Initially at block 402, a plurality of items of an item listing system are accessed at a primary device associated with a set of extended interface devices. Each item in the item listing system is associated with an extended interface configuration that indicates customized-item-specific interface instructions for extended presentation of each item on an extended interface device. At block 404, based on a first extended interface configuration of a first item from the plurality of item, a first extended interface device is identified from the set extended interface devices. At block 406, based on a second extended interface configuration of a second item from the plurality of items, a second extended interface device is identified from the set of extended interface devices. At block 408, a first customized-item-specific interface of the first item is caused to be generated on the first extended interface device and a second customized-item-specific interface of the second item on the second extended interface device.

Turning to FIG. 5, a flow diagram is provided that illustrates a method 500 for customized-item-specific interfaces of items on extended interface devices. Initially at block 510, access an indication to update an extended interface configuration of a first item. The indication includes a second-user extended interface device for updating the extended interface device for updating the first item extended interface configuration. At block 502, based on receiving the indication to update the first extended interface configuration, updating the first extended interface configuration. At block 504, based on updating the first item extended interface configuration, causing generation of a customized-item-specific interface of the first item on the second-user extended interface device in social mode.

Example Search System Environment

With reference to the search system 100, embodiments described herein support providing query result items based on an interface extension engine. The search system components refer to integrated components that implement the image search system. The integrated components refer to the hardware architecture and software framework that support functionality using the search system components. The hardware architecture refers to physical components and interrelationships thereof and the software framework refers to software providing functionality that may be implemented with hardware operated on a device. The end-to-end software-based search system may operate within the other components to operate computer hardware to provide search system functionality. As such, the search system components may manage resources and provide services for the search system functionality. Any other variations and combinations thereof are contemplated with embodiments of the present invention.

By way of example, the search system may include an API library that includes specifications for routines, data structures, object classes, and variables may support the interaction the hardware architecture of the device and the software framework of the search system. These APIs include configuration specifications for the search system such that the components therein may communicate with each other for form generation, as described herein.

With reference to FIG. 1, FIG. 1 illustrates an exemplary search system 100 in which implementations of the present disclosure may be employed. In particular, FIG. 1 shows a high level architecture of search system 100 having components in accordance with implementations of the present disclosure. It should be understood that this and other arrangements described herein are set forth only as examples. In addition, a system, as used herein, refers to any device, process, or service or combination thereof. As used herein, engine is synonymous with system unless otherwise stated. A system may be implemented using components or generators as hardware, software, firmware, a special-purpose device, or any combination thereof. A system may be integrated into a single device or it may be distributed over multiple devices. The various components or generators of a system may be co-located or distributed. For example, although discussed for clarity as the content application component, operations discussed may be performed in a distributed manner. The system may be formed from other systems and components thereof. It should be understood that this and other arrangements described herein are set forth only as examples.

Having identified various component of the search system 100, it is noted that any number of components may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Further, although some components of FIG. 1 are depicted as single components, the depictions are exemplary in nature and in number and are not to be construed as limiting for all implementations of the present disclosure. The search system 100 functionality may be further described based on the functionality and features of the above-listed components.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Example Computing Environment

Having briefly described an overview of embodiments of the present invention, an example operating environment in which embodiments of the present invention may be implemented is described below in order to provide a general context for various aspects of the present invention. Referring initially to FIG. 7 in particular, an example operating environment for implementing embodiments of the present invention is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A computer-implemented method, the method comprising:
   communicating a search query;
   based on communicating the search query, receiving search results at an interface extension engine client on a primary interface device associated with a set of extended interface devices each having corresponding interface extension engine clients, the search results comprising a plurality of items of an item listing system associated with the search query and an interface extension engine wherein each item in the plurality of items is associated with an extended interface configuration that is a computing object in a defined data structure that indicates customized-item-specific interface instructions for extended presentation of each item on an extended interface device, the extended interface configuration enables creating extended interface session from the primary interface devices to the set of extended interface devices, wherein the interface extension engine enables storing each item with a corresponding extended interface configuration that is digitally encoded to each item, the corresponding extended interface configurations are communicated as part of the search results responsive to the search query, wherein the extended interface configuration comprises a selected user preference from preference data and instructions for presenting a corresponding item of the extended interface configuration using a customized interface for the corresponding item, the selected user preference is a device type different from the primary interface device that is explicitly identified by a user as the extended interface device when listing the corresponding item on the item listing system;

determining, based on a first extended interface configuration of a first item, that the first item is extendable to a first extended interface device in the set of extended interface devices, the first extended interface device comprising a first extended interface device interface extension engine client;

based on determining that the first item is extendable, initiating an extended interface session associated with the extended interface engine client and the first extended interface device interface extension engine client, wherein the extended interface session is initiated using the first extended interface configuration of the first item to include customized-item-specific interfaces, user preferences, and extended interface operations in the extended interface session; and based on the extended interface session, communicating an item extended interface data of the first item to cause generation of a customized-item-specific interface of the first item on the first extended interface device that is different from the primary interface device, wherein the customized-item-specific interface is associated with tailored interface features, presentation instructions, and user interaction controls for the first extended interface device, which enable the first item to be presented and support user interactions that are different on the first extended interface device relative to the primary interface device.

2. The method of claim 1, wherein the primary interface device is enabled to extend presentation of the plurality of items based on an association between the primary interface device and the set of extended interface devices, wherein the primary interface device comprises operations and interfaces to establish the association with the set of extended interface devices and cause generation of customized-item-specific interfaces on the set of extended interface devices.

3. The method of claim 1, wherein the set of extended interface devices have corresponding device types associated with corresponding device type interface features, wherein extended interface configuration of items are based on item features of the items and device interface features of the device type.

4. The method of claim 1, wherein the extended interface configuration is communicated to the primary interface device as item listing data to support identifying a preferred device type for extending presentation of the first item.

5. The method of claim 1, wherein determining that the first extended interface configuration of the first item is extendable to the first extended interface device further comprises:

accessing the first extended configuration of the first item;

based on the first extended configuration, determining that the first item is extendable to extended interface device having the device type;

accessing the set of extended interface devices; and determining that the first extended interface device matches the device type in the first extended configuration of the first item.

6. The method of claim 1, wherein automatically causing of the customized-item-specific interface of the first item on the first extended interface device that is different from the primary interface device is based on a casting protocol that allows the first extended interface device to receive item extended interface data to cause display of the first item via the first extended interface device.

7. The method of claim 1, further comprising the primary interface device operating in a social mode with a second-user extended interface device in the set of extended interface devices, wherein social mode is trigged based on an update to a preferred device in an extended interface configuration of the first item to the second-user extended interface device, to cause extenting the first item to the second-user extended interface in the social mode.

8. One or more computer storage media having computer-executable instructions embodied thereon that, when executed, by one or more processors, cause the one or more processors to perform a method, the method comprising:

communicating a search query;

based on communicating the search query, receiving search results, at an interface extension engine client on a primary interface device associated with a set of extended interface devices each having corresponding interface extensions engine clients, the search results comprising a plurality of items of an item listing system associated with the search query and an interface extension engine, wherein each item in the plurality of items is associated with an extended interface configuration that is a computing object in a defined data structure that indicates customized-item-specific interface instructions for extended presentation of each item on an extended interface device, the extended interface configuration enables creating extended interface session from the primary interface devices to the set of extended interface devices, wherein the interface extension engine enables storing each item with a corresponding extended interface configuration that is digitally encoded to each item, the corresponding extended interface configurations are communicated as part of the search results responsive to the search query, wherein the extended interface configuration comprises a selected user preference from preference data and instructions for presenting a corresponding item of the extended interface configuration using a customized interface for the corresponding item, the selected user preference is a device type different from the primary interface device that is explicitly identified by a user as the extended interface device when listing the corresponding item on the item listing system;

determining, based on a first extended interface configuration of a first item, that the first item is extendable to a first extended interface device in the set of extended interface devices, the first extended interface device comprising a first extended interface device extension engine client;

determining, based on a first extended interface configuration of a first item, that the first item is extendable to a first extended interface device in the set of extended interface devices, the first extended interface device comprising a first extended interface device interface extension engine client;

based on determining that the first item is extendable, initiating an extended interface session associated with the extended interface engine client and the first extended interface device interface extension engine client, wherein the extended interface session is initiated using the first extended interface configuration of the first item to include customized-item-specific interfaces, user preferences, and extended interface operations in the extended interface session; and based on the extended interface session, communicating an item extended interface data of the first item to cause generation of a customized-item-specific interface of the first item on the first extended interface device that is different from the primary interface device, wherein the customized-item-specific interface is associated with tailored interface features, presentation instructions, and user interaction controls for the first extended interface device, which enable the first item to be presented and support user interactions that are different on the first extended interface device relative to the primary interface device.

9. The media of claim 8, wherein the primary interface device is enabled to extend presentation of the plurality of items based on an association between the primary interface device and the set of extended interface devices, wherein the primary interface device comprises operations and interfaces to establish the association with the set of extended interface devices and cause generation of customized-item-specific interfaces on the set of extended interface devices.

10. The media of claim 8, wherein the set of extended interface devices have corresponding device types associated with corresponding device type interface features, wherein extended interface configuration of items are based on item features of the items and device interface features of the device type.

11. The media of claim 8, wherein the extended interface configuration is communicated to the primary interface device as item listing data to support identifying a preferred device type for extending presentation of the first item.

12. The media of claim 8, wherein determining, based on a third extended interface configuration of a third item, that a device type of the third item is not the set of extended interface devices to causing bypassing extending the third item.

13. The media of claim 8, wherein automatically causing of the customized-item-specific interface of the first item on the first extended interface device that is different from the primary interface device is based on a casting protocol that allows the first extended interface device to receive item extended interface data to cause display of the first item via the first extended interface device.

14. The media of claim 8, further comprising the primary interface device operating in a social mode with a second-user extended interface device in the set of extended interface devices, wherein social mode is trigged based on an update to a preferred device in an extended interface configuration of the first item to the second-user extended interface device, to cause extending the extended interface configuration to the second-user extended interface in the social mode.

15. A computerized search system, the search system comprising:
one or more processors; and
one or more computer storage media storing computer-useable instructions that, when used by the one or more processors, cause the one or more processors to execute:
receiving a search query;
based on receiving the search query, generating search results associated with a plurality of items of an item listing system,
wherein each item in the plurality of items is associated with an extended interface configuration that is a computing object in a defined data structure indicates customized-item-specific interface instructions for extended presentation of each item on an extended interface device, the extended interface configuration enables creating extended interface session from the primary interface devices to the set of extended interface devices,
wherein the interface extension engine enables storing each item with a corresponding extended interface configuration that is digitally encoded to each item, the corresponding extended interface configurations are communicated as part of the search results responsive to the search query,
wherein the extended interface configuration comprises a selected user preference from preference data and instructions for presenting a corresponding item of the extended interface configuration using a customized interface for the corresponding item, the selected user preference is a device type different from the primary interface device that is explicitly identified by a user as the extended interface device when listing the corresponding item on the item listing system;
communicating item listing data for the plurality of items to a primary interface device causing the primary interface device to:
determine, based on a first extended interface configuration of a first item, that the first item is extendable to a first extended interface device in the set of extended interface devices, the first extended interface device comprising a first extended interface device interface extension engine client; and
based on determining that the first item is extendable, initiate an extended interface session associated with the extended interface engine client and the first extended interface device interface extension engine client, wherein the extended interface session is initiated using the first extended interface configuration of the first item to include customized-item-specific interfaces, user preferences, and extended interface operations in the extended interface session; and
based on the extended interface session, communicate an item extended interface data of the first item to cause generation of a customized-item-specific interface of the first item on the first extended interface device that is different from the primary interface device, wherein the customized-item-specific interface is associated with tailored interface features, presentation instructions, and user interaction controls for the first extended interface device, which enable the first item to be presented and support user interactions that are different on the first extended interface device relative to the primary interface device.

16. The system of claim 15, wherein the primary interface device is enabled to extend presentation of the plurality of items based on an association between the primary interface device and the set of extended interface devices, wherein the primary interface device comprises operations and interfaces to establish the association with the set of extended interface devices and cause generation of customized-item-specific interfaces on the set of extended interface devices.

17. The system of claim 15, wherein the set of extended interface devices have corresponding device types associated with corresponding device type interface features, wherein extended interface configuration of items are based on item features of the items and device interface features of the device type.

18. The system of claim 15, wherein the plurality of items are associated with a landing page of the search system.

19. The system of claim 15, wherein the first item extended interface configuration is generated based on:
accessing an item feature of the first item;
based on the item feature of the first item, identifying a device type having devices interface features that correspond to the item feature of the first item, wherein the device interface features support a customized-item-specific display configuration of the first item; and
generating the first item extended interface configuration comprising the device type as a preferred device type for extending presentation of the first item.

20. The system of claim 15, further comprising the primary interface device operating in a social mode with a second-user extended interface device in the set of extended interface devices, wherein social mode is trigged based on an update to a preferred device in an extended interface configuration of the first item to the second-user extended interface device, to cause extending the extended interface configuration to the second-user extended interface in the social mode.

* * * * *